UNITED STATES PATENT OFFICE.

AVANDO W. H. VIVIAN, GEORGE LLEWELLYN DAVIES, AND LUDWIG GROTE, OF LONDON, ENGLAND, ASSIGNORS TO COMPOSITE FUEL SYNDICATE LIMITED, OF LONDON, ENGLAND, A JOINT STOCK COMPANY OF ENGLAND.

MANUFACTURE OF ARTIFICIAL FUEL.

967,863.  Specification of Letters Patent.  Patented Aug. 16, 1910.

No Drawing.  Application filed February 4, 1909.  Serial No. 476,065.

*To all whom it may concern:*

Be it known that we, AVANDO WARREN HUSSEY VIVIAN, engineer, a subject of the King of Great Britain, residing at 103 Hop Exchange, London, England, GEORGE LLEWELLYN DAVIES, civil engineer, a subject of the King of Great Britain, residing at 72 and 73 Hop Exchange, London, England, and LUDWIG GROTE, engineer, a subject of the Emperor of Germany, residing at 177 Mount Pleasant road, Tottenham, London, England, have invented certain new and useful Improvements in or Relating to the Manufacture of Artificial Fuel, of which the following is a specification.

Briquets have formerly been made by mixing the following constituents: coal dust, lime or chalk, water, specially treated liquid hydrocarbons, and a suitable binder, such as magnesite cement. The special treatment of the liquid hydrocarbons related to increasing the viscosity or density thereof by treatment with a number of substances, such as chlorid of sulfur or a sulfurizing agent.

The present invention covers an improved method in subjecting the hydrocarbon, at a particular stage of the process, to chlorin or chlorin producing compounds. The chlorin might be used in its gaseous form, but it is found in practice more convenient to use some compound or substances which serve as a vehicle for the chlorin, and we have found the common chlorid of lime, or bleaching powder, to be most advantageous and convenient.

According to the present invention, briquets of artificial fuel are manufactured from carbonaceous material, such as coal, lignite, peat, coke or the like, or any desired mixture of them, in a comminuted condition; liquid hydrocarbons, such, for instance, as fuel oil or tar, especially gas tar, chlorinated as hereinafter described; lime, unless the chlorinating agent carries lime; and water.

The briquets are formed in the following manner: The liquid hydrocarbons are first chlorinated by a suitable chlorinating agent, such as bleaching powder, by mixing the chlorinating agent with the hydrocarbons and thoroughly stirring the mass. When the mixture has been thoroughly stirred or agitated, and it may be allowed to stand as long as desired, it is heated and then water is added, the whole mass being again stirred. Oxid of calcium, or quick lime, is then mixed in suitable proportions with the chlorinated oil and water, but this addition of lime may be dispensed with if chlorid of lime has been used as a chlorinating agent. The whole mass is then stirred together, producing a very thick viscous mixture somewhat like gum or rubber, which mass will hereinafter be termed the "binding material". This binding material is after this treatment ready for use, and can be used at once or may be stored and used at any time. A quantity of the aforesaid binding material is placed in a suitable vessel provided with means for heating it and with stirring devices, and after the binding material is thoroughly heated and softened, the desired proportion of the coal dust or other carbonaceous material is introduced into the mixing vessel. The whole mass is then thoroughly mixed or kneaded together under heat, either with or without the further addition of water, for a period of about ten minutes, during which time the temperature of the mass may be raised up to 320° F. or 400° F., and this may be effected by the employment of superheated steam in the jacket of a mixing vessel. After the whole mass has been thoroughly mixed together, it is then discharged and preferably allowed to cool, but it may be pressed into briquets either while hot or cold.

We will now describe one example of making briquets, giving the exact proportions. 550 kilos of gas tar are put into a closed vessel, in the cold, which vessel is fitted with a stirrer. 40 kilos of bleaching powder are then added and the mass is stirred slowly for a considerable time. The chlorinated mass is then placed in a suitable mixing and heating vessel and again heated and stirred, about 140 kilos of water being added during the heating and stirring process. Then 270 kilos of quick lime in a powdered or finely divided state are mixed with the chlorinated tar and water, the whole mass being stirred and heated during this admixture, which continues for a sufficient time, say about fifteen minutes. On cooling, a thick homogeneous or rubber-like mass is obtained, which is the binding material. In a suitable mixing and heating device, we mix 300 kilos of this binding material with 70 kilos of coal dust and 70 kilos of water, the water being added with or after the coal dust. The mass is stirred and agitated by any suitable means, the mixing device being heated with superheated steam, so that the temperature of the whole fuel mixture, while it is thus being mixed, is raised to about 320° F. to 400° F. After the materials have been thoroughly mixed together, which usually takes about ten minutes, the fuel material is discharged, for example into the hopper of a centrifugal sieve, which feeds it into a conveyer, whereby it is fed into the briqueting machine, where it is pressed into briquets which will thoroughly harden in a very short time.

We do not confine ourselves to the exact proportions and details given above, as these may be obviously varied according to circumstances as required. Instead of chlorid of lime, chlorin gas may be employed, or chlorin gas mixed with steam. In such a case, of course, a larger proportion of lime should be added to the mixture in the subsequent steps of the process. Instead of the use of quick lime, we may use calcium hydroxid $CaO_2H_2$; in other words, we may add water to the quick lime and then, while it is hot, add it to the previously chlorinated tar; or water may be added to the chlorinated tar and then the lime; or in some instances, we may simply use tar and bleaching powder without adding any further lime or water. In all cases, after the various components have been mixed together, we may add water or not, as is preferred, to the mixture, depending on the nature of the carbonaceous material employed.

We claim:—

1. The herein described process of manufacturing artificial fuel, which consists in chlorinating liquid hydrocarbons, forming a binding material, then mixing said binding material with carbonaceous material under heat, and pressing the mixture into briquets.

2. The herein described process of manufacturing artificial fuel, which consists in chlorinating liquid hydrocarbons by thoroughly mixing them with chlorid of lime, thus forming a binding material, mixing said binding material with pulverized carbonaceous material under the influence of heat, and pressing the mixture into briquets.

3. The herein described process of manufacturing artificial fuel, which consists in chlorinating liquid hydrocarbons by mixing them with bleaching powder, thereby forming a binding material, and mixing said binding material with pulverized quick lime and pulverized carbonaceous material under heat to form the fuel mixture, and then pressing said mixture into briquets.

4. The herein described process of making artificial fuel, which consists in mixing gas tar with about eight per cent. of bleaching powder, adding water thereto, adding to the mass about one-third of its weight of quick lime, and thoroughly stirring the same together, forming a binding material, mixing with said binding material about five times its weight of pulverized carbonaceous material, heating the mixture, and pressing the same into briquets.

5. As a new article of manufacture, briquets of artificial fuel, composed of chlorinated hydrocarbons mixed with lime and pulverized carbonaceous material, substantially as described.

In witness whereof we have hereunto set our hands in presence of two witnesses.

A. W. H. VIVIAN.
  G. LLEWELLYN DAVIES.
  LUDWIG GROTE.

Witnesses:
 HENRY BIRKBECK,
 H. D. JAMESON.